(12) United States Patent
Wada et al.

(10) Patent No.: US 6,583,828 B1
(45) Date of Patent: Jun. 24, 2003

(54) LIQUID CRYSTAL DISPLAY DEVICE AND ITS MANUFACTURING METHOD

(75) Inventors: Tomohiro Wada, Kagoshima (JP); Takusei Sato, Tokyo (JP); Fumiaki Abe, Kanagawa (JP)

(73) Assignee: Sony Corporation (JP)

( * ) Notice: Subject to any disclaimer, the term of this patent is extended or adjusted under 35 U.S.C. 154(b) by 233 days.

(21) Appl. No.: 09/641,821

(22) Filed: Aug. 21, 2000

(30) Foreign Application Priority Data

Aug. 25, 1999 (JP) .......................................... 11-238442

(51) Int. Cl.$^7$ ............................................ G02F 1/1336
(52) U.S. Cl. ............................................ 349/39; 349/38
(58) Field of Search ....................... 349/39, 38; 257/59, 257/72

(56) References Cited

U.S. PATENT DOCUMENTS

RE36,836 E * 8/2000 Hayashi et al. ................ 257/72

* cited by examiner

*Primary Examiner*—James Dudek
(74) *Attorney, Agent, or Firm*—Rader, Fishman & Grauer PLLC; Ronald P. Kananen

(57) ABSTRACT

A liquid crystal display device having a thin-film transistor formed on a substrate for driving an pixel electrode comprises a holding capacitor line underlying a thin-film semiconductor layer which forms the thin-film transistor, and a first holding capacitor dielectric film formed between the holding capacitor line and the thin-film semiconductor layer, a first holding capacitor element being made up of the thin-film semiconductor layer and the holding capacitor line interposing the first holding capacitor dielectric film therebetween. And a manufacturing method of above liquid crystal display device comprises the steps of forming the holding capacitor line on said substrate, forming the first holding capacitor dielectric film on the holding capacitor line, forming the thin-film semiconductor layer constituting the thin film transistor on the first holding capacitor dielectric film so that the holding capacitor line and the thin-film semiconductor layer interposing the first holding capacitor dielectric film therebetween make up the first holding capacitor element.

20 Claims, 7 Drawing Sheets

LIQUID CRYSTAL DISPLAY DEVICE AND ITS MANUFACTURING METHOD

BACKGROUND OF THE INVENTION

1. Field of the Invention

This invention relates to a liquid crystal display device and its manufacturing method, especially suitable for application to a liquid crystal display device including a driving-purpose thin film transistor (TFT).

2. Description of the Related Art

Recently, liquid crystal display devices are used more often as light bulbs of projectors. Along with this tendency, liquid crystal display devices must have higher optical transmittance and higher definition. Liquid crystal. display devices using conventional techniques are explained below.

As shown in FIG. 1, a thin-film semiconductor layer 102 made of polycrystalline Si and having a predetermined configuration is provided on a quartz glass substrate 101 in a shading region, and a gate dielectric film 103 is provided on the thin-film semiconductor layer 102. On the gate dielectric film 103, a gate line 104 is provided. Although not shown, a source region and a drain region are formed in the thin-film semiconductor layer 102 in self-alignment with the gate line 104. The gate line 104 forming a gate electrode, and the source region and drain regions make up a polycrystalline Si TFT for driving pixel electrodes. On the gate dielectric film 103 in a predetermined location above the drain region, a holding capacitor line 105 is provided. The structure interposing the gate dielectric film 103 between the holding capacitor line 105 and the drain region constitute a holding capacitance element.

An inter-layer insulating film 106 is formed to cover the gate line 104 and the holding capacitor line 105. In predetermined locations of the inter-layer insulating film 106 and the gate dielectric film 103, contact holes 107, 108 are made. On the inter-layer insulating film 106, a lead-out electrode 109 is formed in connection with the drain region of the polycrystalline Si TFT through the contact hole 107, and a signal line 110 is formed in connection with the source region of the polycrystalline Si TFT through the contact hole 108. An inter-layer insulating film 111 is formed so as to cover the lead-out electrode 109 and signal line 110. The inter-layer insulating film 111 has formed a contact hole 112 in a predetermined position above the lead-out electrode 109. On the inter-layer insulating film 111, an upper-layer shading film 113 is formed in connection with the lead-out electrode 109 through the contact hole 112. The upper-layer shading film 113, lead-out electrode 109 and signal line 110 stacked together shade all region excluding pixel opening regions from incident light from above. Another inter-layer insulating film 114 is formed to cover the upper-layer shading film 113. The inter-layer insulating film 114 has formed a contact hole 115 in a predetermined position above the upper-layer shading film 113. On the inter-layer insulating film 114, a transparent pixel electrode 116 is provided in contact with the upper-layer shading film 113 through the contact hole 115. The pixel electrode 116 is covered by an orientation film 117 stacked thereon.

On the orientation film 117, a liquid crystal layer 118 is provided, which is covered by an orientation film 119 and an opposed common electrode 120. On the opposed common electrode 120, a transparent opposed electrode substrate 121 is provided.

In the liquid crystal display device having the above-explained configuration, a voltage applied to the transparent pixel electrode 116 connected to the thin-film semiconductor layer 102 forming TFT changes orientation of liquid crystal molecules in the liquid crystal layer 118 to control the display.

The signal line 110, gate line 104, holding capacitor line 105, thin-film transistor, and so on, are located within a inter-pixel shading region provided in the TFT substrate or opposed substrate. An example of such arrangement is shown in FIG. 9. FIG. 9 is an example of plan-view layout of the case where the signal lines 110 of the TFT substrate and the upper-layer shading film 113 form a shading region in a complementary fashion.

As shown in FIG. 9, in the conventional liquid crystal device, the gate line 104 and the holding capacitor line 105 extend in parallel, and the signal lines 110 extend to intersect with these gate line 104 and holding capacitor line 105. The lead-out electrodes 109 extend over the gate line 104 and the holding capacitor line 105 so as to bridge them in locations not overlapping the signal lines 110. Each upper-layer shading film 113 has a geometry bridging two adjacent signal lines 110 and covering parts of the holding capacitor line 105, the gate line 104 and lead-out electrode 109 located between these two signal lines 110. Each contact hole 108 is formed in a location of the signal line 110 overlapping an end portion of the thin-film semiconductor layer 102. The thin-film semiconductor layer 102 underlies the holding capacitor line 105 and the signal line layer 110. The holding capacitor line 105 has offset portions for avoiding the contact holes 107. Through each contact hole 107 in the offset portion, the thin-film semiconductor layer 102 and the lead-out electrode 119 are connected together. In the region where the lead-out electrode 109 and the upper-layer shading film 113 overlap, the contact hole 102 is formed to connect them. Further, in the region where the upper-layer shading film 113 and the holding capacitor line 105 overlap, the contact hole 15 is formed to connect them.

In the conventional liquid crystal device having the above-explained configuration, in order to realize a high optical transmittance and a high definition, it is necessary to reduce the inter-pixel shading regions of the liquid crystal display device.

However, according to the knowledge of the Inventor, signal lines 110, thin-film transistors, gate lines 104 and holding capacitor lines 105 occupy their respective areas in the conventional liquid crystal display device, and this is the bar against improvement of the pixel opening ratio.

OBJECTS AND SUMMARY OF THE INVENTION

It is therefore an object of the invention to provide a liquid crystal display device and its manufacturing method which can reduce the inter-pixel shading area and thereby realize a high optical transmittance and a high definition.

According to the first aspect of the invention, there is provided a liquid crystal display device having a thin-film transistor formed on a substrate for driving an pixel electrode, comprising:

a holding capacitor line underlying a thin-film semiconductor layer which forms the thin-film transistor; and a first holding capacitor dielectric film formed between the holding capacitor line and the thin-film semiconductor layer, a first holding capacitor element being made up of the thin-film semiconductor layer and the holding capacitor line interposing the first holding capacitor dielectric film therebetween.

In the first aspect of the invention, the a first insulating film is typically interposed between the thin-film semiconductor layer and the holding capacitor line. The first insulating film has a part which is thinner than the other part thereof and forms the first holding capacitor dielectric film. Further, in the first aspect of the invention, a recess is preferably formed in the first insulating film to make the portion thinner than the other part in the first insulating film, and the recess constitutes the first holding capacitor dielectric film.

In the first aspect of the invention, the holding capacitor line is typically set in a constant electric potential.

In the first aspect of the invention, the holding capacitor line is formed in a region overlapping and flatly cover a channel region in a thin-film transistor.

In the first aspect of the invention, the first holding capacitor dielectric film may be made of a silicon oxide film, silicon nitride film, or multi-layered film of a silicon oxide film and a silicon nitride film.

In the first aspect of the invention, the thin-film semiconductor layer forming the holding capacitor element is typically made of an extended portion of a diffusion layer in the thin-film transistor, and a conductive impurity is introduced into the extended portion to reduce its resistance.

In the first aspect of the invention, a holding capacitor electrode is typically provided on the thin-film semiconductor layer via a second holding capacitor dielectric film, and the holding capacitor electrode and the thin-film semiconductor layer underlying via the second holding capacitor dielectric film make up a second holding capacitor element.

Configuration of this holding capacitor electrode is the same as the configuration of the gate line in the thin-film transistor. More specifically, the gate line and the holding capacitor electrode have a structure stacking a tungsten silicide film on a polycrystalline Si film, for example. Still in the first aspect of the invention, the second holding capacitor dielectric film is made of a dielectric film which is used as a gate dielectric film in the thin-film transistor.

According to the second aspect of the invention, there is provided a manufacturing method of a liquid crystal display device having a driving thin-film transistor formed on a substrate, comprising the steps of:

forming a holding capacitor line on the substrate;

forming a first holding capacitor dielectric film on the holding capacitor line; and forming a thin-film semiconductor layer constituting the thin film transistor on the first holding capacitor dielectric film so that the holding capacitor line and the thin-film semiconductor layer interposing the first holding capacitor dielectric film therebetween make up a first holding capacitor element.

Typically, in the second aspect of the invention, a first insulating film is formed on the holding capacitor line, and a portion thinner than the other part of the first insulating film is formed in the first insulating film so that the thinner portion of the first insulating film makes up the first holding capacitor dielectric film. Further, in the second aspect of the invention, by typically making the first insulating film on the holding capacitor line and making a recess in the first insulting film, the first holding capacitor dielectric film made of the recess in the first insulating film is formed.

In the second aspect of the invention, the holding capacitor line is typically made in a process different from the process for making a gate line forming the thin-film transistor.

In the second aspect of the invention, by preferably making a second holding capacitor dielectric film on the thin-film semiconductor layer making the holding capacitor electrode on a second insulating film, a second holding capacitor element made up of the holding capacitor electrode and the thin-film semiconductor layer is formed via the second holding capacitor dielectric film. At that time, for the purpose of reducing steps of the manufacturing process, the holding capacitor electrode is made simultaneously with the gate line of the thin-film transistor.

In the second aspect of the invention, preferably by making a second insulating film on the holding capacitor line, making an opening in the second insulating film to expose the surface of the holding capacitor line, and making on oxide film on the exposed surface of the holding capacitor line, the first holding capacitor dielectric film made of the oxide film is formed. For making the oxide film, anodic oxidation or annealing is conducted to form the oxide film on the exposed surface of the holding capacitor line. Thickness of the oxide film is preferably not thinner than 5 nm and not thicker than 300 nm, and more preferably, not thinner than 10 nm and not thicker than 100 nm.

In the present invention, typically used as the thin-film semiconductor layer is a polycrystalline Si film. It is also possible to use a single-crystal Si film, amorphous Si film, or a compound semiconductor film of gallium arsenide (GaAs), for example.

In the present invention, in order to secure a sufficient holding capacity $C_s$ of the first holding capacitor element, thickness of the holding capacitor dielectric film is preferably not thinner than 5 nm and not thicker then 300 nm, and more preferably, not thinner than 10 nm and not thicker than 100 nm.

In the present invention, the holding capacitor line is made of tungsten, molybdenum, tantalum, chrome, titanium, tungsten alloy, molybdenum alloy, tantalum alloy, chrome alloy, titanium alloy, tungsten silicide, molybdenum silicide, tantalum silicide, chrome silicide, titanium silicide, or silicon doped with an impurity.

According to the liquid crystal display device and its manufacturing method having the above configuration according to the invention, since the holding capacitor line is provided under the thin-film semiconductor layer forming the thin-film transistor so that the thin-film semiconductor layer and the holding capacitor line stacked via the holding capacitor dielectric film make up the holding capacitor element, it is possible to configure the thin-film transistor and the holding capacitor line not to occupy their own areas, respectively, and rather make them in the region flatly overlapping them.

The above, and other, objects, features and advantage of the present invention will become readily apparent from the following detailed description thereof which is to be read in connection with the accompanying drawings.

DETAILED DESCRIPTION OF THE PREFERRED EMBODIMENTS

Figure 1:
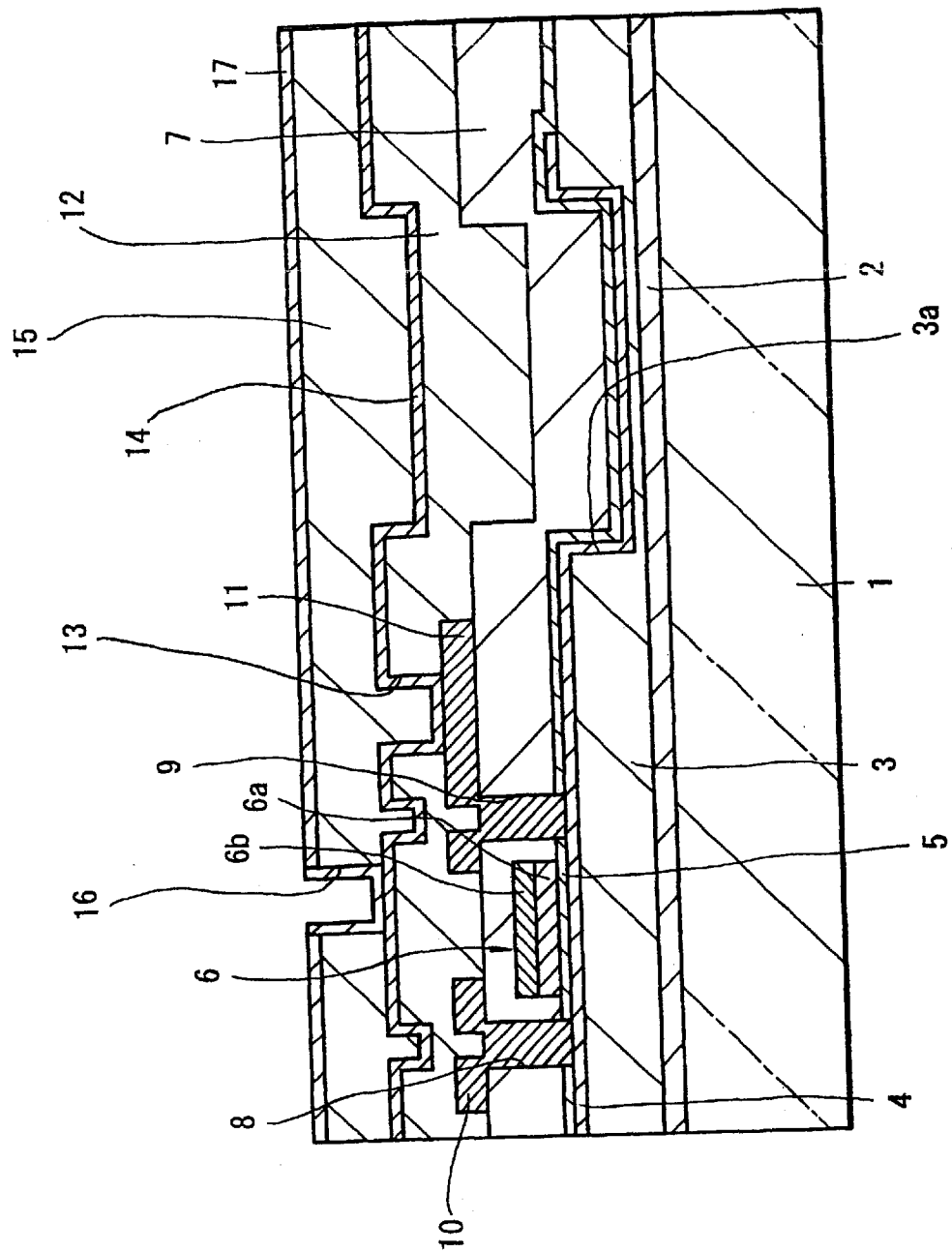
FIG. 1 is a cross-sectional view showing a conventional liquid crystal display device.

Explained below are embodiments of the invention with reference to the drawings. In all figures illustrating embodiments, identical or equivalent elements or parts are labeled with common reference numerals.

Figure 2:
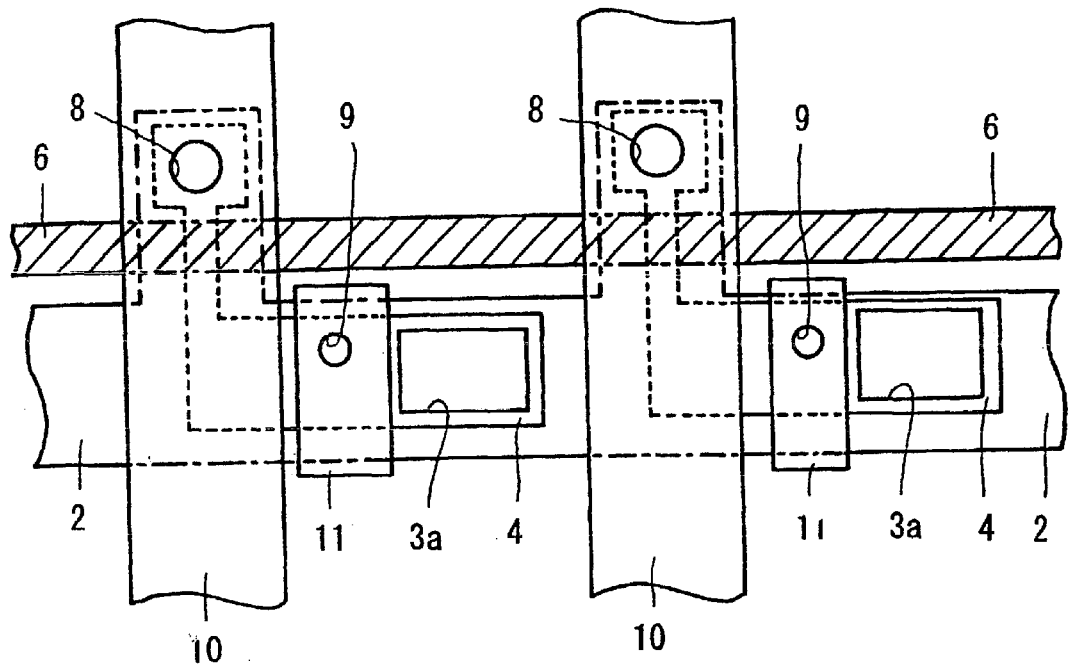
FIG. 2 is a plan view showing a plan-viewed layout of a TFT substrate of the conventional liquid crystal display device.
Figure 3:
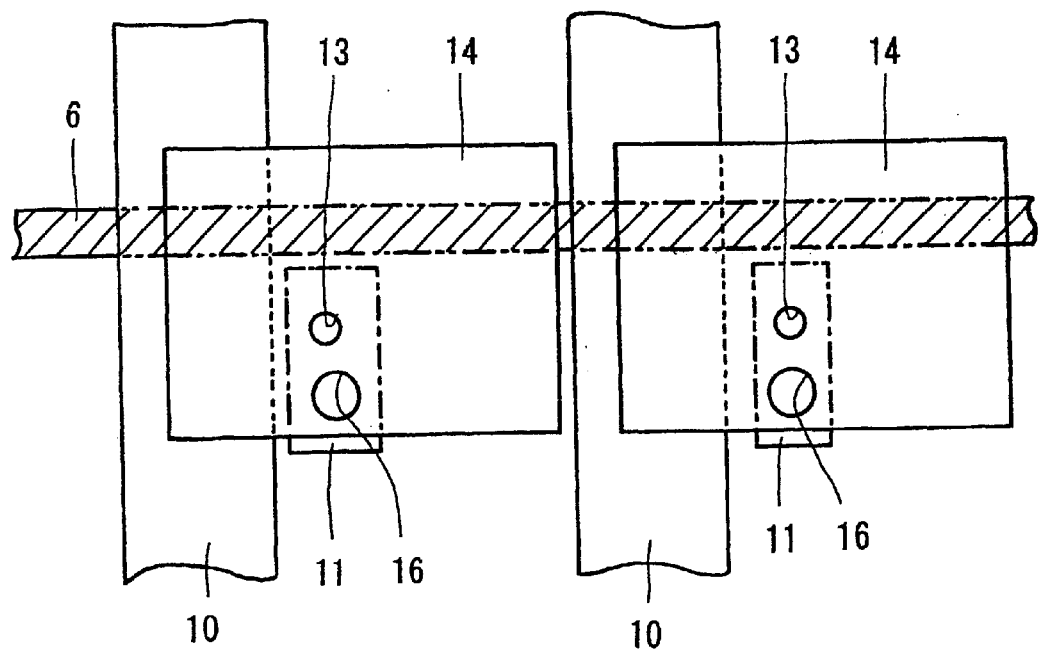
FIG. 3 is a cross-sectional view showing a TFT substrate of a liquid crystal display device according to the first embodiment of the invention.

First explained is an example of the first embodiment of the invention. FIG. 3 shows a TFT substrate of a liquid crystal display device as this example of the first embodiment. FIGS. 2 and 3 show plan-viewed aspects of the TFT substrate. The cross-sectional view of FIG. 1 is not a specific cross-section of FIGS. 2 and 3, but shows a configuration of the TFT substrate according to the first embodiment in a single cross section.

As shown in FIG. 1, in this liquid crystal display device, a holding capacitor line 2 patterned to cross a display region is provided on an insulating transparent substrate 1 made of quartz glass, for example, in a shading region. The holding capacitor line 2 is made of a 200 nm thick WSi film for example.

Formed on the holding capacitor line 2 is an inter-layer insulating film 3 commonly used as a holding capacitor dielectric film. This inter-layer insulating film;3 is a 600 nm thick non-doped silicate glass (NSG), for example. The inter-layer insulating film 3 has, in a part thereof, a portion thinner than the other part. More specifically, a recess 3a is formed in a portion of the inter-layer insulating film 3. Then, the bottom of the recess 3a constitutes the holding capacitor dielectric film. Thickness of the bottom of the recess 3a of the inter-layer insulating film 3, which is the holding capacitor dielectric film, is selected from the range of 5 to 300 nm, more preferably from the range of 10 to 100 nm, in order to ensure a large holding capacity $C_s$ of the holding capacitor element, which is explained later, and to prevent a short-circuit. In the first embodiment, it is 60 nm, for example.

Formed on the inter-layer insulating film 3 is a thin-film semiconductor layer 4 of a predetermined geometry. This thin-film semiconductor layer 4 is a 75 nm thick polycrystalline Si film, for example. The thin-film semiconductor layer 4 has a portion which is an extended portion of the drain region of TFT explained later. The extended portion of the thin-film semiconductor layer 4 is lowered in resistance by doping a conductive impurity such as phosphorus (P) or arsenic (As), and this portion is used as a pixel potential electrode. The structure interposing the holding capacitor dielectric film made of the bottom of the recess 3a in the inter-layer insulating film 3 between the extended portion of the thin-film semiconductor layer 4 and the holding capacitor line 2 makes up a holding capacitor element.

A $SiO_2$ film 5 is formed to cover the thin-film semiconductor layer 4. The $SiO_2$ film 5 is made of 30 nm thick $SiO_2$, for example. On the $SiO_2$ film 5, a gate line 6 is provided.

The gate line 6 is a multi-layered film sequentially stacking a polycrystalline Si film 6a having the thickness of 100 nm, for example, and doped with an impurity of P, for example, to a high concentration, and a WSi film 6b having the thickness of 100 nm, for example. Although not shown, the thin-film semiconductor layer 4 has formed therein a source region and a drain region of a LDD (lightly doped drain) structure intended for reducing the OFF current. The gate line 6 forming a gate electrode and these source and drain regions make up a polycrystalline Si TFT for driving a pixel electrode.

An inter-layer insulating film 7 is provided to cover the gate line 6. The inter-layer insulating film 7 may be a 600 nm thick phosphorus-doped silicate glass (PSG), for example. In predetermined locations of the inter-layer insulating film 7 and the $SiO_2$ film 5, contact holes 8, 9 are formed. On the inter-layer insulating film 7 in the shading region, a signal line 10 is formed and connected to the source region of the polycrystalline Si TFT through the contact hole 8. A lead-out electrode 11 is also formed in connection with the drain region of the polycrystalline Si TFT through the contact hole 9. The signal line 10 and lead-out electrode 11 are 400 nm thick Al alloy films containing Si by 1%, for example. So as to cover the signal line 10 and lead-out electrode 11, an inter-layer insulating film 12 is provided. This inter-layer insulating film 12 may be a 400 nm thick PSG film, for example. In a portion of the inter-layer insulating film 12 above the lead-out electrode 11, a contact hole 13 is made.

On the inter-layer insulating film 12, a conductive upper-layer shading film 14 is stacked.

The upper-layer shading film 14 is connected to the lead-out electrode 11 through the contact hole 13. The upper-layer insulating film 14 is a 250 nm thick titanium (Ti) film, for example. The stacked structure of the upper-layer shading film 14, lead-out electrode 11 and signal line 10 shades all region excluding the pixel opening regions from incident light from above. The upper-layer insulating film 14 is connected to a pixel electrode explained later.

An inter-layer insulating film 15 is stacked to cover the upper-layer shading film 14. The inter-layer insulating film 15 is a 2.5 $\mu$m thick NSG film, for example. In a location of the inter-layer insulating film 15 above the upper-layer shading film 14, a contact hole 16 is made. The top surface of the inter-layer insulating film 15 other than the, portion of the contact hole 16 is smoothed. Formed on the inter-layer insulating film 15 is a transparent pixel electrode 17 connected to the upper-layer shading film 14 through the contact hole 16. The pixel electrode 17 is a 140 nm thick indium tin oxide (ITO) film, for example. So as to cover the pixel electrode 17, an orientation film (not shown) is stacked.

In this manner, the TFT substrate is constructed. Although not shown, a liquid crystal is confined between the TFT substrate and the multi-layered structure made by sequentially stacking a transparent electrode as an opposed electrode and a liquid crystal orientation film on one major surface of a glass substrate, the liquid crystal display device is constructed.

FIG. 2 shows a plan-viewed layout of the liquid crystal display device just after making the signal line 10 and the lead-out electrode 11. As shown in FIG. 2, in the liquid crystal display device according to the first embodiment, signal lines 10 extend in parallel with a predetermined pitch. The holding capacitor line 2 and the gate line 6 extend in parallel with each other in the direction intersecting with the signal lines 10. The holding capacitor line 2 includes projecting portions made in substantially the same intervals as the intervals of the signal lines 10 along the lengthwise direction of the holding capacitor line 2 so as to straddle the gate line 6 and be covered by the signal lines 10.

The thin-film semiconductor layer 4 is L-shaped to extend along inner sides of each projection and the straight portion of the holding capacitor line 2. The holding capacitor line 2 lies in the region where, in a plan view, it overlaps and covers the channel region of the thin-film transistor made up of the thin-film semiconductor layer 4 and the gate line 6. For the purpose of reducing light entering from the bottom surface of the TFT substrate into the thin-film transistor, the holding capacitor line 2 is configured to extend over an area larger at least than that of the channel region preferably securing a margin of about 1.0 $\mu$m.

More specifically, in order to improve the shading effect also against light entering at an angle from the bottom of the TFT substrate, the area of the holding capacitor line 2 is made larger by 0.5 $\mu$m than the channel region in the right and left directions in its plan view. In this manner, even when the liquid crystal display device is used in a device like a projector in which optical elements exist in the bottom side of the TFT substrate, it is possible to prevent irradiation of the thin-film transistor by incident light from such optical elements. As a result, it is possible to prevent an increase of an optically excited current when the thin-film transistor is OFF and hence prevent deterioration of the quality of images caused thereby.

In a region of the L-shaped thin-film semiconductor layer 4 at one end thereof near the gate line 6, the contact hole 8 is formed. Then, each signal line 10 and each thin-film semiconductor layer 4 are electrically connected together through the contact hole 8. In the region of the L-shaped thin-film semiconductor layer 4 at the other end thereof overlapping the holding capacitor line 2, the recess 3a is made to have a rectangular shape in its plan view. Then in the rectangular recess 3a, the thin-film semiconductor layer 4 and the holding capacitor line 2 interposing the bottom of the recess 3a therebetween make up each holding capacitor element.

Alternatively, the plan-viewed geometry of this recess 3a may be a circle.

In the region overlapping each holding capacitor line 2 and each thin-film semiconductor layer 4, the lead-out line 11 is formed. The lead-out line 11 is configured not overlap the recess 3a. In the region where the lead-out line 11, thin-film semiconductor 4 and holding capacitor line 2 overlap, the contact hole 9 is made. Through this contact hole 9, the lead-out line 11 and the thin-film semiconductor 4 are electrically connected.

FIG. 3 shows a plan-viewed layout of the liquid crystal display device after making the upper-layer shading film 14. As shown in FIG. 3, the upper-layer shading film 14 is configured to bridge every adjacent parallel signal line 10 and substantially cover the lead-out electrode 11. In the region where the upper-layer shading film 14 and the lead-out electrode 11 overlap, the contact hole 13 is made.

Through this contact hole 13, the upper-layer shading film 14 and the lead-out electrode 11 are electrically connected together. In the region where the upper-layer shading film 14 and the lead-out electrode 11 overlap, a contact hole 16 is made. Through this contact hole 16, the upper-layer shading film 14 and the pixel electrode 17 (not shown in FIG. 3) are connected.

In the liquid crystal display device having the above-explained configuration, when it is driven, the holding capacitor line 2 is set in a constant potential, for example, in 0 V in the first embodiment. This potential may be any other appropriate potential in the range not giving influences to the threshold voltage Vth of the thin-film transistor, such as the potential of the opposed common electrode and the potential of the power source of an operating circuit, for example.

Next explained is a manufacturing method of the liquid crystal display device having the above-explained configuration according to the first embodiment.

First as shown in FIG. 1, a 200 nm thick WSi film is made on the insulating transparent substrate 1 by CVD, for example. Thereafter, the WSi film is patterned to extend across the display region, thereby to form the holding capacitor line 2.

After that, so as to cover the holding capacitor line 2, a NSG film is stacked on the entire surface by atmospheric pressure chemical vapor deposition (AP-CVD), for example, to form the inter-layer insulating film 3.

Subsequently, a resist pattern (not shown) having an opening in the location for the recess 3a is formed by lithography on the inter-layer insulating film 3 which is the NSG film. Subsequently, by reactive ion etching (RIE), for example, using this resist pattern as a mask, the inter-layer insulating film 3 is etched until exposing the top surface of the holding capacitor line 2, and the resist pattern is removed thereafter. Next, by CVD, a NSG film is formed on the entire surface. At this time, the NSG film is stacked to be 5~300 nm thick, preferably 10~100 nm thick, on the exposed surface of the holding capacitor line 2. In the first embodiment, it is 60 nm thick, for example. As a result of making the NSG film, the recess 3a forming a holding capacitor element later is formed in the inter-insulating film 3.

After that, the thin-film semiconductor layer 4, 75 nm thick, for example, is formed on the entire surface of the inter-layer insulating film 3 by low pressure chemical vapor deposition (LP-CVD), for example. Consecutively, by growing crystal grains of the thin-film semiconductor layer 4 by annealing, and thereafter, the thin-film semiconductor layer 4 is patterned by lithography and etching.

Then, after oxidizing the surface of the thin-film semiconductor layer 4, a p-type impurity like B, for example, is ion-implanted to a low concentration into the entire surface to form a low-concentrated diffusion layer (not shown) in selective portions of the thin-film semiconductor layer 4.

After that, the SiO$_2$ film 5 is stacked by CVD, for example, on the entire surface. Thickness of the SiO$_2$ film 5 is 30 nm, for example.

Next formed on the entire surface is the polycrystalline Si layer 6a of the thickness of 100 nm, for example, by LP-CVD, for example. After that, by annealing in a POCl$_3$ gas atmosphere, P is diffused in the polycrystalline Si: layer 6a to reduce its resistance. Thereafter, by CVD, for example, the WSi film 6b is formed on the entire surface up to the thickness of 100 nm, for example. Then, by lithography and etching, the WSi film 6b and the polycrystalline Si layer 6a are patterned into a predetermined geometry to make the gate line 6.

Subsequently, an n-type impurity such as P, for example, is ion-implanted to the entire surface by a low concentration. Thereafter, by lithography, a resist pattern (not shown) is formed on the region for a p-channel MOS transistor and the region for a LDD structure of an n-channel MOS transistor, and by using this mask as a resist pattern, an n-type impurity such as As is ion implanted to a high concentration. As a result, the thin-film transistor and other n-channel MOS transistors having a LDD structure are made. The resist pattern is removed thereafter. Subsequently, by lithography, a resist pattern is formed to cover the n-channel MOS transistor regions, and using this resist pattern as a mask, a p-type impurity such as B is ion-implanted. As a result, p-channel MOS transistors are made. The resist pattern is removed thereafter.

After that, by CVD using ozone ($O_3$) gas and TEOS gas, a PSG film is formed on the entire surface to make the inter-layer insulating film 7 having the thickness of 600 nm, for example. Thereafter, high-temperature annealing is conducted to recover the crystalline property in the source/drain regions of all transistors.

Subsequently, by wet etching, for example, contacts (not shown) for the holding capacitor line are made at the right and left ends outside the display region. Next, a resist pattern (not shown) having openings for the contact holes 8, 9 is made. Then, using this resist pattern as a mask, the inter-layer insulating film 7 is selectively removed by etching to make the contact holes 8 and 9. The resist pattern is removed thereafter.

In the next step, by sputtering, for example, an Al alloy film containing 1% of Si, for example, is stacked on the entire surface. Thickness of this Al alloy film is 400 nm, for example. Thereafter, by lithography, a resist pattern (not shown) having the pattern of the signal lines 10, lead-out electrodes 11, circuit lines and pads is formed on the Al alloy film. Then, using this resist pattern as a mask, by etching the Al alloy film by dry etching, for example, until exposing the top surface of the inter-layer insulating film 7, the signal lines 10 and lead-out electrode 11 are made, and circuit lines and pads, not shown, are also made.

Subsequently, by CVD using $O_3$ gas and TEOS gas, for example, a PSG film is stacked on the entire surface to make the inter-layer insulating film 12 up to the thickness of 400 nm, for example. Next by lithography, a resist pattern (not shown) having apertures in the region for the contact hole 13 and the regions for pads is formed on the inter-layer insulating film 12. Then, using this resist pattern as a mask, the inter-layer insulating film 12 is selectively removed by dry etching, for example, until exposing the top surface of the lead-out electrode 11, to make the contact hole 13 and contact holes (not shown) for connection to pads.

After that, by sputtering, for example, a 250 nm thick Ti film, for example, is stacked on the entire surface, and next patterned to make the upper-layer shading film 14.

Thereafter, by plasma CVD using TEOS gas, for example, a 2.5 $\mu$m thick NSG film, for example, is stacked on the entire surface to make the inter-layer insulating film 15. After that, by chemical-mechanical polishing (CMP), for example, the inter-layer insulating film 15 is polished to smooth its surface. Next, by lithography, a resist pattern having apertures in the region for the contact hole 16 and regions for pads (not shown) is formed on the inter-layer insulating film 15.

Then, using this resist pattern as a mask, the inter-layer insulating film 15 is selectively removed by dry etching, for example, until exposing the top surface of the upper-layer shading film 14. As a result, the contact hole 16 is made, and contact holes (not shown) for connection to pads are made.

Thereafter, by annealing in a N2 gas atmosphere containing H by 4%, the transistor property is improved.

After that, by sputtering, for example, an ITO film is stacked on the inter-layer insulating film 15 to connect it to the upper-layer insulating film 14 at the bottom surface of the contact hole 16. Then, by patterning this ITO film into a predetermined geometry, the pixel electrode 17 is made.

Through these steps, the TFT substrate according to the first embodiment is completed. After that, a liquid crystal is confined between the TFT substrate and the structure sequentially stacking a transparent electrode as the opposed electrode and an orientation film for the liquid crystal on a major surface of a glass substrate to complete the intended liquid crystal display device.

As explained above, according to the first embodiment, since the holding capacitor line 2 is formed under the thin-film transistor to make up the holding capacitor element by interposing the bottom of the recess 3a in the inter-layer insulating film 3 between the holding capacitor line 2 and the thin-film semiconductor layer 4, restriction by the gate line 6 forming the thin-film transistor can be reduced in the layout of the holding capacitor line 2. Therefore, the region of the holding capacitor line 2 and the region of the thin-film transistor can be overlapped to reduce the shading area between pixels. As a result, the liquid crystal display device manufactured by using this TFT substrate can be improved in optical transmittance and definition.

Figure 4:
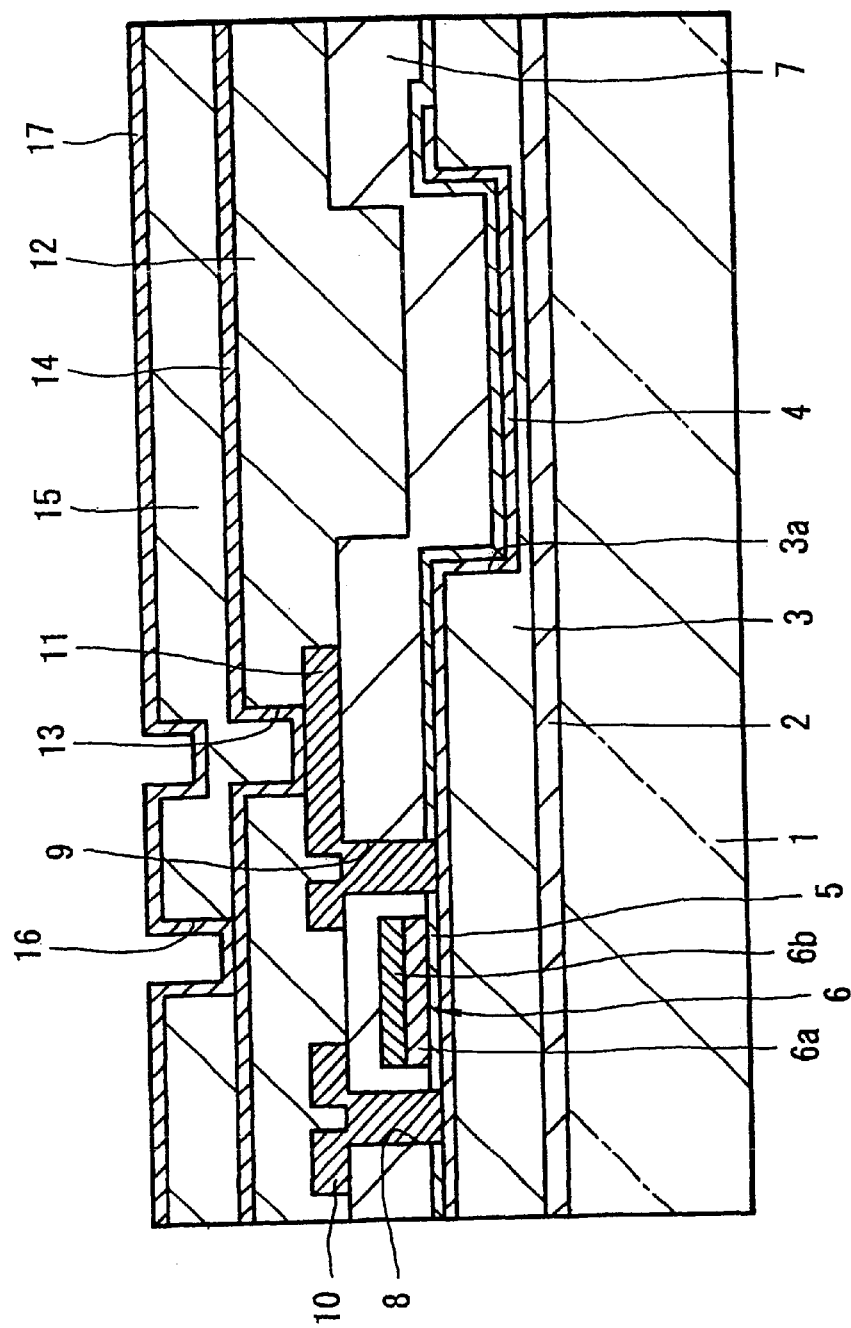
FIG. 4 is a plan view showing a plan-viewed layout of the TFT substrate according to the first embodiment of the invention.

Next explained is an example of the second embodiment of the invention. FIG. 4 shows an example of TFT substrate in the second embodiment.

As shown in FIG. 4, in the liquid crystal display device according to the second embodiment, the top surface of the inter-layer insulating film excluding the regions of contact holes is smoothed, and the upper-layer shading film 14 is formed on the smoothed inter-layer insulating film 12.

In the manufacturing method of the liquid crystal display device according to the second embodiment, the same steps as those of the first embodiment are conducted up to the step of making the signal line 10 and the lead-out line 11. After that, by CVD using $O_3$ gas and TEOS gas, for example, a PSG film is stacked on the entire surface to make the inter-layer insulating film 12. After that, by CMP, for example, the top surface of the inter-layer insulating film 12 is smoothed. Next by lithography, a resist pattern (not shown) having an aperture in the region for the contact hole 13 is formed on the inter-layer insulating film 12. Next by etching using this resist: pattern as a mask, the inter-layer insulating film 12 is selectively removed until exposing the top surface of the lead-out line 11 to make the contact hole 13. After that, by sequentially stacking the upper-layer shading film 14, inter-layer insulating film 15, contact hole 16 and pixel electrode 17, the TFT substrate is completed.

In the other respects, the second embodiment is the same as the first embodiment, and its explanation is omitted.

According to the liquid crystal display device according to the second embodiment, its features are the same as those of the first embodiment excluding that the top surface of the inter-layer insulating film 12 is smoothed and the upper-layer shading film 14 is formed on the smoothed inter-layer insulating film 12. Therefore, the second embodiment ensured the same effects as those of the first embodiment. Additionally, since the top surface of the inter-layer insulating film 12 is smoothed, good coverage is ensured in the upper-layer shading film 14. Therefore, its shading effect against incident light from the direction of the opposed substrate is improved, and the parasitic capacitance between the signal line 10 and the upper-layer shading layer 14 can be reduced. Therefore, this liquid crystal display device can further improve the image quality.

Figure 5:
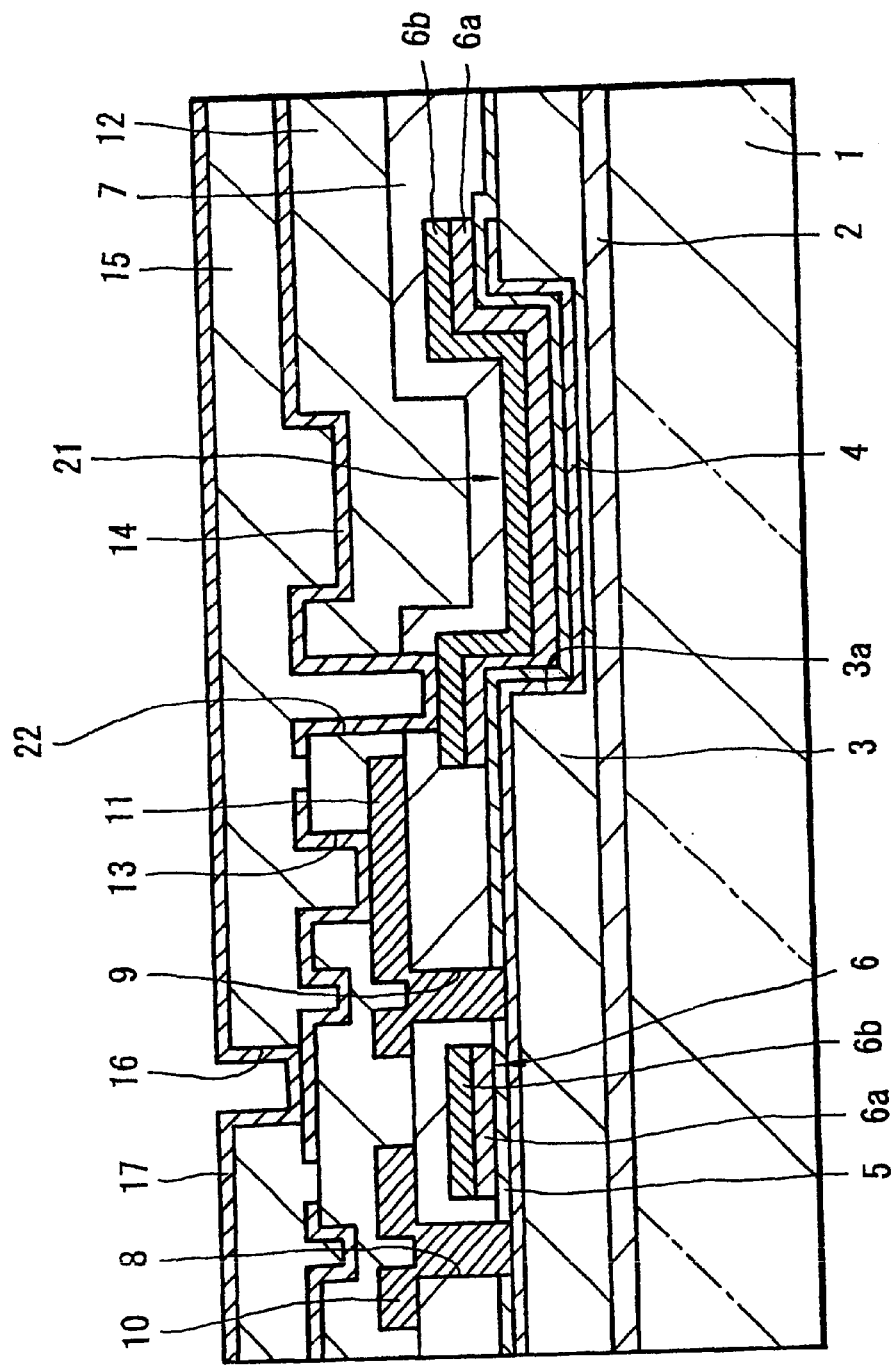
FIG. 5 is a plan view showing a plan-viewed layout of the TFT substrate according to the first embodiment of the invention.
Figure 6:
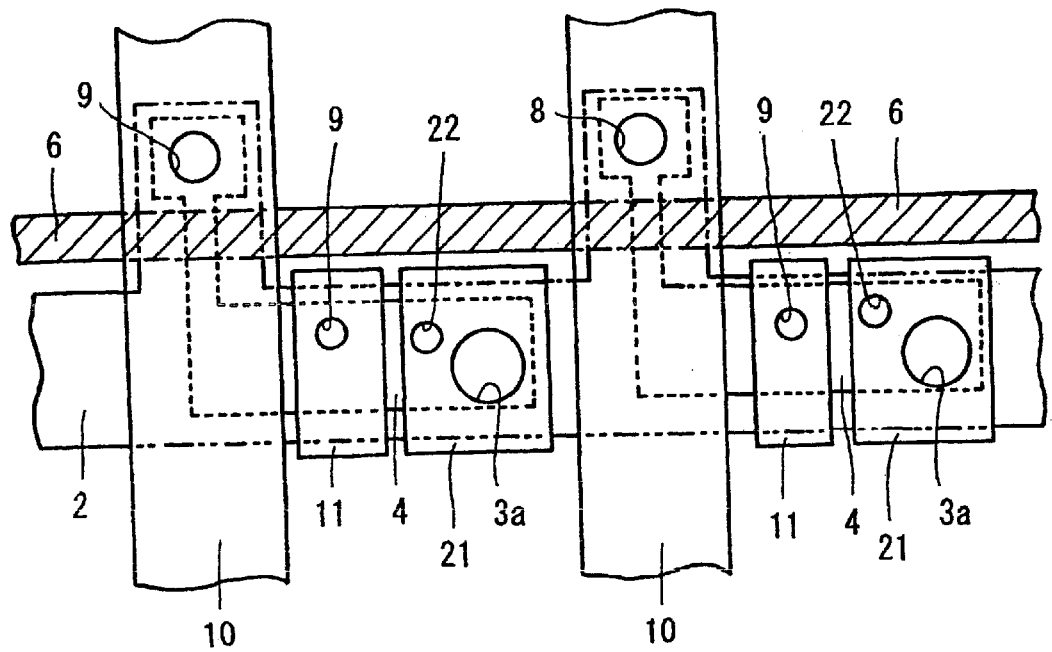
FIG. 6 is a cross-sectional view showing a TFT substrate of a liquid crystal display device according to the second embodiment of the invention.
Figure 7:
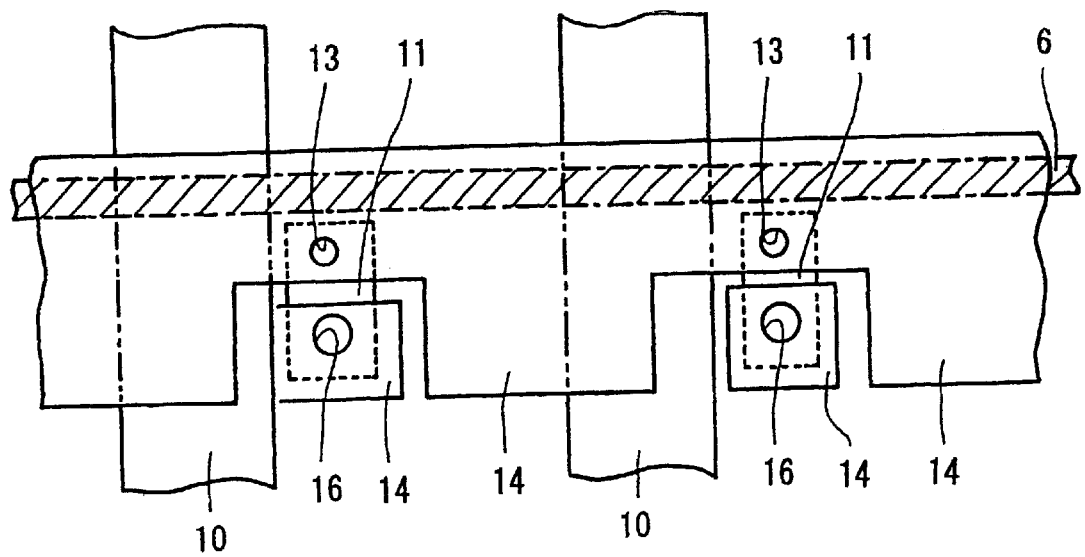
FIG. 7 is a cross-sectional view showing a TFT substrate of a liquid crystal display device according to the third embodiment of the invention.
Figure 8:
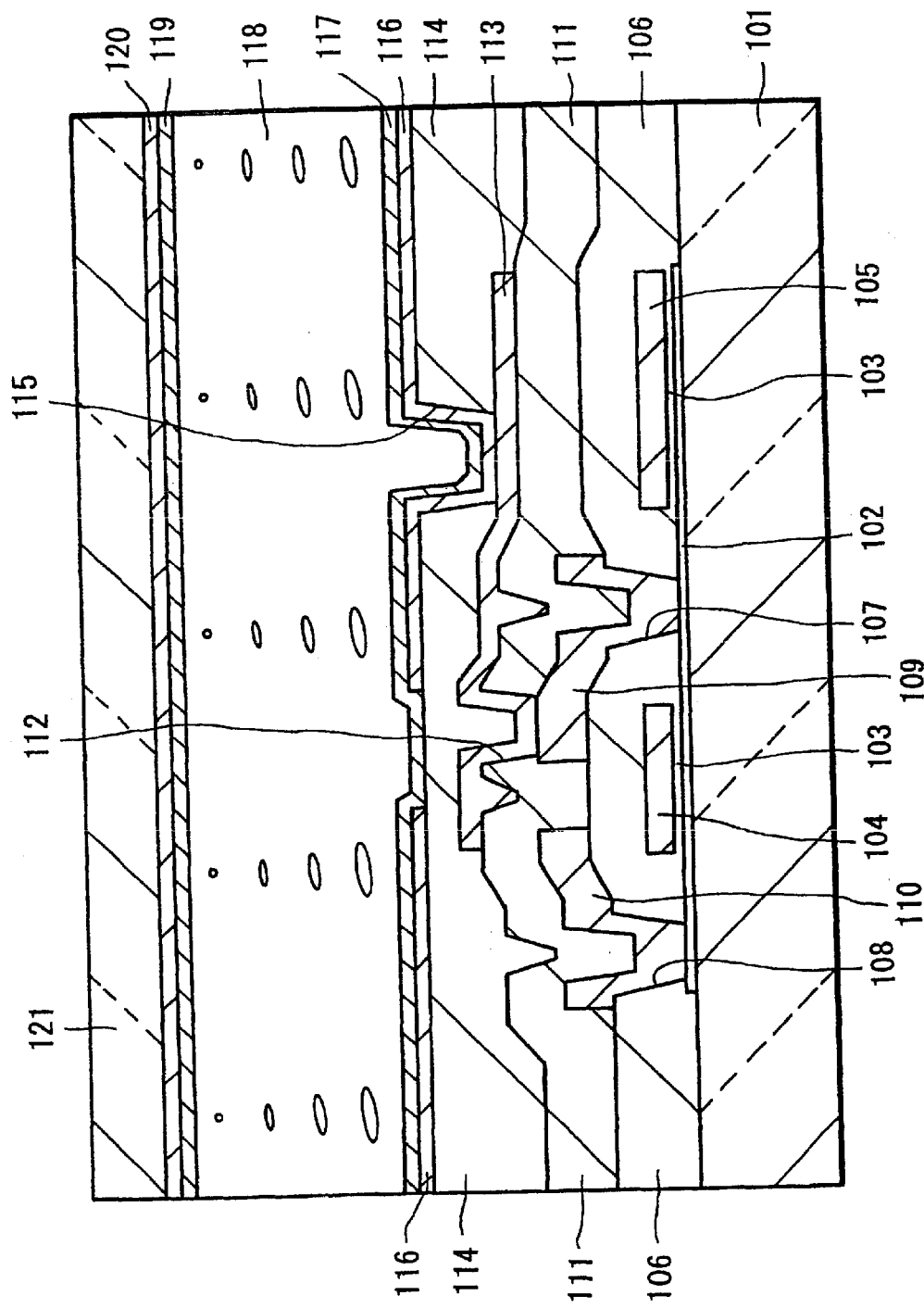
FIG. 8 is a plan view showing a plan-viewed layout of the TFT substrate of the liquid crystal display device according to the first embodiment of the invention.
Figure 9:
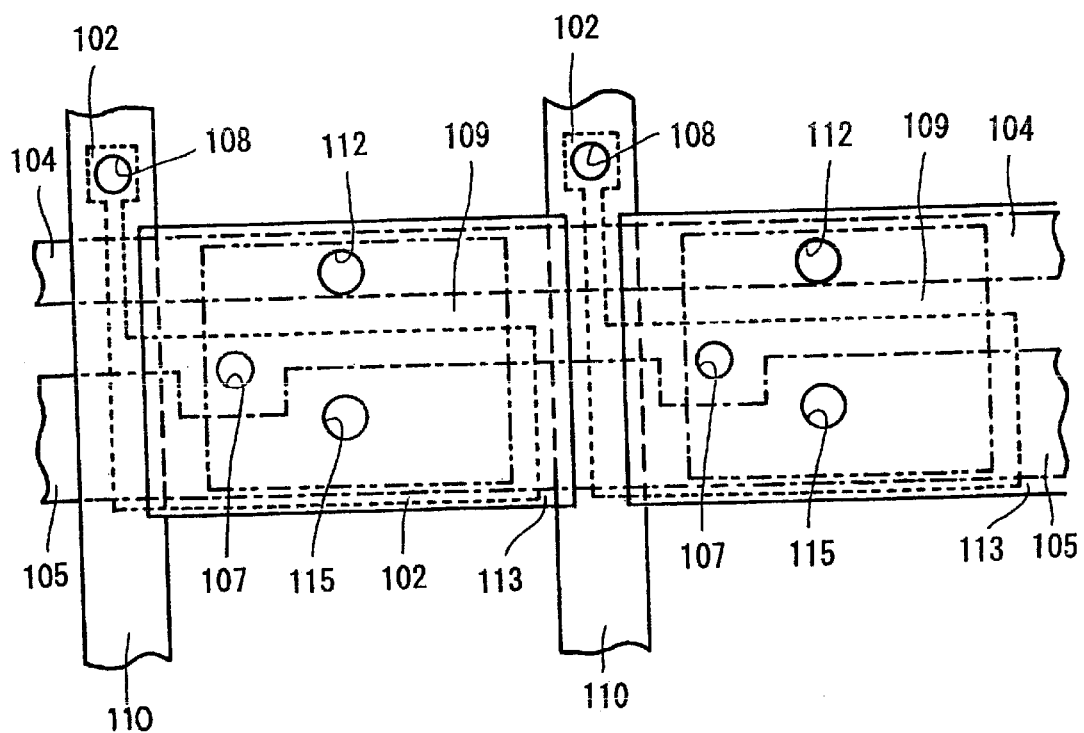
FIG. 9 is a plan view showing a plan-viewed layout of the TFT substrate according to the third embodiment of the invention.

Next explained is an example of the third embodiment of the invention. FIG. 5 shows an example of TFT substrate of the liquid crystal display device according to the third embodiment, and FIGS. 6 and 7 show plan-viewed aspects of the TFT substrate. The cross-sectional view of FIG. 5 is not a specific cross-section of FIGS. 6 and 7, but shows configuration of the TFT substrate according to the third embodiment in a single cross section.

As shown in FIG. 5, in the liquid crystal display device according to the third embodiment, a holding capacitor electrode 21 having the same multi-layered structure as the gate electrode 6 is provided so as to cover the recess 3a in the inter-layer insulating film 3. Then, from the structure interposing the bottom surface of the recess 3a as the first holding capacitor dielectric film between the holding capacitor line 2 and the thin-film semiconductor layer 4, a first holding capacitor element is made. Additionally, the SiO$_2$ film 5 to be commonly used as the gate dielectric film in TFT is interposed as a second holding capacitor dielectric film between the holding capacitor electrode 21 and the thin-film semiconductor layer 4, and this structure makes up a second holding capacitor element.

Further, a contact hole 22 is made in a portion of the inter-layer insulating films 7 and 12 above the holding capacitor electrode 21. Through this contact hole 22, the upper-layer shading film 14 and the holding capacitor electrode 21 are electrically connected. The upper-layer shading film 14 is used not only for blocking incident light but also as a line for setting the holding capacitor electrode 21 in a predetermined constant potential. As a result, the holding capacitor electrode 21 can be set to a predetermined constant potential. In this case, the holding capacitor line 2 and the holding capacitor electrode 21 can be equalized in potential. That is, these first holding capacitor element and second holding capacitor element are electrically connected in parallel, sharing a portion of the thin-film semiconductor layer 4, which is an extension of the drain region of the thin-film transistor, as a common pixel potential electrode.

FIG. 6 shows a plan-viewed layout of the TFT substrate just after making the signal line 10 and the lead-out electrode 11. As shown in FIG. 6, the plan-viewed layout of the TFT substrate according to the third embodiment is different from the first embodiment in that the holding capacitor electrode 21 is provided adjacent to the lead-out electrode 11 between two adjacent signal lines 10. This holding capacitor electrode 21 is formed to straddle the holding capacitor line 2. In the region of the holding capacitor electrode 21, the recess 3a of the inter-layer insulating film 3 and a contact hole 22 are formed.

FIG. 7 shows a plan-viewed layout of the TFT substrate after making the upper-layer shading film 14. As shown in FIG. 7, the plan-viewed layout of the TFT substrate according to the third embodiment is different from the first embodiment in that the upper-layer shading film 14 is configured to extend across the lengthwise direction of the signal line 10. The upper-layer shading film 14 is made up of two parts, i.e., the elongated part having recesses, and rectangular parts located inside the respective recesses.

Next explained is the manufacturing method of the liquid crystal display device having the above-explained configuration according to the third embodiment. In the third embodiment, the same steps as those of the first embodiment are progressed until making the polycrystalline Si film 6a and the WSi film 6b. After that, by lithography, a resist pattern (not shown) having the pattern of the gate line and the holding capacitor electrode is formed. Next, using this resist pattern as a mask, the WSi film 6b and the polycrystalline Si film 6a are sequentially etched to make the gate line 6 and the holding capacitor electrode 21 simultaneously.

Subsequently, after making the thin-film transistor having the source/drain regions of an LDD structure, a PSG film is formed on the entire surface by CVD using O$_3$ gas and TEOS gas. As a result, the inter-layer insulating film 7 is made. After that, high-temperature annealing is conducted to recover the crystalline property in the source/drain regions.

After that, by wet etching, for example, contacts (not shown) for the holding capacitor line are made at the right and left ends outside the display region. Thereafter, a resist pattern (not shown) having apertures in regions for the contact holes 8, 9 are made. Next using this resist pattern as a mask, the inter-layer insulating film 7 is selectively removed by dry etching, for example, to made the contact holes 8 and 9.

In the next step, by sputtering, for example, an Al alloy film containing 1% of Si, for example, is stacked on the entire surface. Thickness of this Al alloy film is 400 nm, for example. Thereafter, by lithography, a resist pattern (not shown) having the pattern of the signal lines 10, lead-out electrodes 11, circuit lines and pads is formed on the Al alloy film. Then, using this resist pattern as a mask, by etching the Al alloy film by dry etching, for example, until exposing the top surface of the inter-layer insulating film 7, the signal lines 10, lead-out electrode 11, circuit lines and pads, not shown, are made.

Subsequently, by CVD using O$_3$ gas and TEOS gas, for example, a PSG film is stacked on the entire surface to make the inter-layer insulating film 12 up to the thickness of 400 nm, for example.

Next by lithography, a resist pattern (not shown) having an aperture in the region for the contact hole 22 is formed on the inter-layer insulating film 12. Then, using this resist pattern as a mask, the inter-layer insulating film 12 is selectively removed to a predetermined depth. The resist pattern is removed thereafter.

Next by lithography, a resist pattern (not shown). having apertures in the regions for the contact holes 13, 22 and the regions above pads is formed on the inter-layer insulating film 12. Then, using this resist pattern as a mask, the inter-layer insulating film 12 is selectively removed by dry etching, for example, until exposing the top surface of the lead-out electrode 11 and the top surface of the holding capacitor electrode 21, to make the contact holes 13, 22. In this etching process, contact holes (not shown) for connection to pads are also made simultaneously. The resist pattern is removed thereafter.

After that, by sputtering, for example, a 250 nm thick Ti film, for example, is stacked on the entire surface so as to connect it to the holding capacitor electrode 21, and it is next patterned to make the upper-layer shading film 14.

In the other respect, the third embodiment is the same as the first embodiment, and its explanation is omitted.

According to the third embodiment, since the holding capacitor line 2 is made to underlie the thin-film semiconductor layer 4, and the first holding capacitor element is made by interposing the bottom of the recess 3a in the inter-layer insulating film 3 between the thin-film semiconductor layer 4 and the holding capacitor line 2, the same effect as those of the first embodiment are obtained. Further, in the third embodiment, since the first holding capacitor element is made up of the holding capacitor line 2 and the thin-film semiconductor layer 4 interposing the bottom of the recess 3a therebetween, the second holding capacitor element is made up of the holding capacitor electrode 21 and the thin-film semiconductor layer 4 interposing the SiO$_2$ film 5 therebetween, and the first and second holding capacitor elements are connected in series, the holding capacity $C_s$ in the TFT substrate can be increased significantly, the lead current can be minimized. Therefore, further improvement of the image quality can be expected in the liquid crystal display device.

Heretofore, the invention has been explained by way of specific embodiments. However, the invention is not limited to these embodiments, but involves various changes or modifications based on the technical concept of the invention.

That is, numerical values, structures, configurations, materials, processes, and others indicated in the above description of the embodiments are not but mere examples, and it is needless to say that other appropriate numerical values, structures, configurations, materials and processes, for example, can be used.

For example, in the first to third embodiments explained above, the WSi film is used as the film for making the holding capacitor line 2 and the gate line 6. However, it may be replaced with another metal film like W film, Mo film, Ta film, Cr film and Ti film or an alloy film like MoSi film, TaSi film, CrSi film or TiSi film, for example. Alternatively, for the purpose of improving the adhesive property with the substrate dielectric film and inter-layer insulating film, it may be stacked with polycrystalline Si doped with an impurity to form a two-layered structure or a three-layered structure.

Furthermore, in the first to third embodiments, the signal line 10, lead-out electrode 11, circuit lines and pads are made of the Al alloy film containing Si by 1%. However, they can be made of an Al-based alloy such as Al—SiCu alloy or Al—Cu alloy, Cu-based alloy, or multi-layered structure using any of these Al-based alloys or Cu-based alloys as a lower layer and stacking thereon a barrier metal such as Ti, TiN, TiON or WSi, for example.

Further, in the first to third embodiments, a polycrystalline Si film is used as the thin-film semiconductor layer 4. However, it is also possible to use an amorphous Si film, single-crystal Si film, or a compound semiconductor layer such as GaAs, for example.

Moreover, in the first embodiment, a 60 nm thick NSG film in the recess 3a of the inter-layer-insulating film 3 is used as the holding capacitor dielectric film of the holding capacitor element. However, for the purpose of improving the specific dielectric constant and resistance to voltage, it is also possible to use an insulating film such as SiN film or three-layered $SiO_2/SiN/SiO_2$ film, for example. Additionally, by using as the holding capacitor dielectric film an oxide film like $TaO_2$ film made by anodic oxidation or annealing of a metal like Ta used as the holding capacitor line 2. In the third embodiment, although the $SiO_2$ film 5 commonly used as the gate dielectric film of the thin-film transistor is used as the holding capacitor dielectric film in the second holding capacitor element, it is also possible to use an insulating film such as SiN film or three-layered $SiO_2/SiN/SiO_2$ film, for example, for the purpose of improving the specific dielectric constant and resistance to voltage.

Furthermore, in the second embodiment, for example, after making a PSG film, by smoothing its surface by CMP, the inter-layer insulating film 12 is made to have a flat top surface. However, for making the inter-layer insulating film with a flat top surface, it is also possible to use a method of first stacking PSG or boron-phosphorus silicate glass BPSG), for example, and then making it reflow; a flow process using spin-on-glass (SOG) or a method of first stacking an insulating film and then smoothing it by etchback.

Further, in the third embodiment, for example, the $SiO_2$ film 5 commonly used as the gate dielectric film in TFT is used as the holding capacitor dielectric film. However, for the purpose of improving the holding capacity and resistance to voltage, it is also possible to separately make the part of the holding capacitor dielectric film in the holding capacitor element and use a $SiO_2$ film, SiN film or their multi-layered film (for example, $SiO_2/SiN/SiO_2$ film). It is also possible to use, as the holding capacitor dielectric film, an oxide film made by oxidation like anodic oxidation or annealing of the metal used as the holding capacitor line 2.

Furthermore, in the third embodiment, for example, although the contact hole 22 is made by two separate etching steps, it is also possible to make the contact holes 13, 22 simultaneously by using an etching gas having an appropriate selectivity.

As described above, according to the liquid crystal display device and its manufacturing method proposed by the invention, since the holding capacitor line is provided under the thin-film semiconductor layer forming the thin-film transistor and the first holding capacitor dielectric film is provided between the holding capacitor line and the thin-film semiconductor layer so that the thin-film semiconductor layer and the holding capacitor line stacked via the first holding capacitor dielectric film make up the holding capacitor element, it is possible to configure the thin-film transistor and the holding capacitor line not to occupy their own areas, respectively. Therefore, the shading area between pixels can be reduced, and a liquid crystal display device with a high optical transmittance and a high definition can be obtained.

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

What is claimed is:

1. A liquid crystal display device having a thin-film transistor formed on a substrate for driving a pixel electrode, comprising:
   a holding capacitor line underlying a thin-film semiconductor layer which forms said thin-film transistor; and
   a first holding capacitor dielectric film formed between said holding capacitor line and said thin-film semiconductor layer,
   a first holding capacitor element being made up of said thin-film semiconductor layer and said holding capacitor line interposing said first holding capacitor dielectric film therebetween
   wherein said thin-film semiconductor layer forming said holding capacitor element is an extended portion of a diffusion region of said thin-film transistor, and a conductive impurity is introduced into said extended portion.

2. The liquid crystal display device according to claim 1 wherein a first insulating film is interposed between said thin-film semiconductor layer and said holding capacitor line, and said first insulating film includes a portion thinner than the remainder part thereof, the thinner portion of said first insulating film constituting said first holding capacitor dielectric film.

3. The liquid crystal display device according to claim 1 wherein a first insulating film is interposed between said thin-film semiconductor layer and said holding capacitor line, and said first insulating film includes a recess which constitutes said first holding capacitor dielectric film.

4. The liquid crystal display device according to claim 1 wherein said holding capacitor line is set at a constant potential.

5. The liquid crystal display device according to claim 1 wherein said holding capacitor line is positioned in a region overlapping and covering a region for the channel of said thin-film when viewed in a plan view.

6. The liquid crystal display device according to claim 1 wherein said holding capacitor dielectric film has a thickness in the range from 5 nm to 300 nm.

7. The liquid crystal display device according to claim 1 wherein said holding capacitor dielectric film has a thickness in the range from 10 nm to 100 nm.

8. The liquid crystal display device according to claim 1 wherein said holding capacitor dielectric film is made of one of a silicon oxide film, a silicon nitride film and a multi-layered film of a silicon oxide film and a silicon nitride film.

9. A liquid crystal display device having a thin-film transistor formed on a substrate for driving a pixel electrode, comprising:

a holding capacitor line underlying a thin-film semiconductor layer which forms said thin-film transistor; and a first holding capacitor dielectric film formed between said holding capacitor line and said thin-film semiconductor layer;

wherein a holding capacitor electrode overlies said thin-film semiconductor layer via a second holding capacitor dielectric film, and said holding capacitor electrode and said thin-film semiconductor layer interposing said second holding capacitor dielectric film therebetween make up a second holding capacitor element.

10. The liquid crystal display device according to claim 9 wherein said holding capacitor electrode has the same structure as a gate line in said thin-film transistor.

11. The liquid crystal display device according to claim 9 wherein said second holding capacitor dielectric film is a part of a dielectric film used as a gate dielectric film in said thin-film transistor.

12. The liquid crystal display device according to claim 1 wherein said holding capacitor line is made of tungsten, molybdenum, tantalum, chrome, titanium, tungsten alloy, molybdenum alloy, tantalum alloy, chrome alloy, titanium alloy, tungsten silicide, molybdenum silicide, tantalum silicide, chrome silicide, titanium silicide, or silicon doped with an impurity.

13. A manufacturing method of a liquid crystal display device having a driving thin-film transistor formed on a substrate, comprising the steps of:

forming a holding capacitor line on said substrate;

forming a first holding capacitor dielectric film on said holding capacitor line; and forming a thin-film semiconductor layer constituting said thin film transistor on said first holding capacitor dielectric film so that said holding capacitor line and said thin-film semiconductor layer interposing said first holding capacitor dielectric film therebetween make up a first holding capacitor element;

wherein, by making a second holding capacitor dielectric film on said thin-film semiconductor layer and making a holding capacitor electrode on said second holding capacitor dielectric film, said holding capacitor electrode and said thin-film semiconductor layer interposing said second holding capacitor dielectric film therebetween make up a second holding capacitor element.

14. A manufacturing method of a liquid crystal display device according to claim 13 wherein, by making a first insulating film on said holding capacitor line and making a part in said insulating film thinner than the remainder part thereof, the thinner portion of said first insulating film is used to constitute said first holding capacitor dielectric film.

15. The manufacturing method of a liquid crystal display device according to claim 13 wherein, by making a first insulating layer on said holding capacitor line and making a recess in said first insulating film, the recess of said first insulating film is used to constitute said first holding capacitor dielectric film.

16. The manufacturing method of a liquid crystal display device according to claim 13 wherein said holding capacitor dielectric film has a thickness in the range from 5 nm to 300 nm.

17. The manufacturing method of a liquid crystal display device according to claim 13 wherein said holding capacitor dielectric film has a thickness in the range from 10 nm to 100 nm.

18. The manufacturing method of a liquid crystal display device according to claim 13 wherein said holding capacitor line is made in a manufacturing step separate from a step of making a gate line forming said thin-film transistor.

19. The manufacturing method of a liquid crystal display device according to claim 13 wherein a gate line of said thin-film transistor is made, and at the same time, said holding capacitor electrode is made.

20. The manufacturing method of a liquid crystal display device according to claim 13 wherein said holding capacitor line is made of tungsten, molybdenum, tantalum, chrome, titanium, tungsten alloy, molybdenum alloy, tantalum alloy, chrome alloy, titanium alloy, tungsten silicide, molybdenum silicide, tantalum silicide, chrome silicide, titanium silicide, or silicon doped with an impurity.

\* \* \* \* \*